Nov. 3 1925.
1,560,080
F. GELSTHARP
APPARATUS FOR MAKING SHEET GLASS
Original Filed Aug. 8, 1923
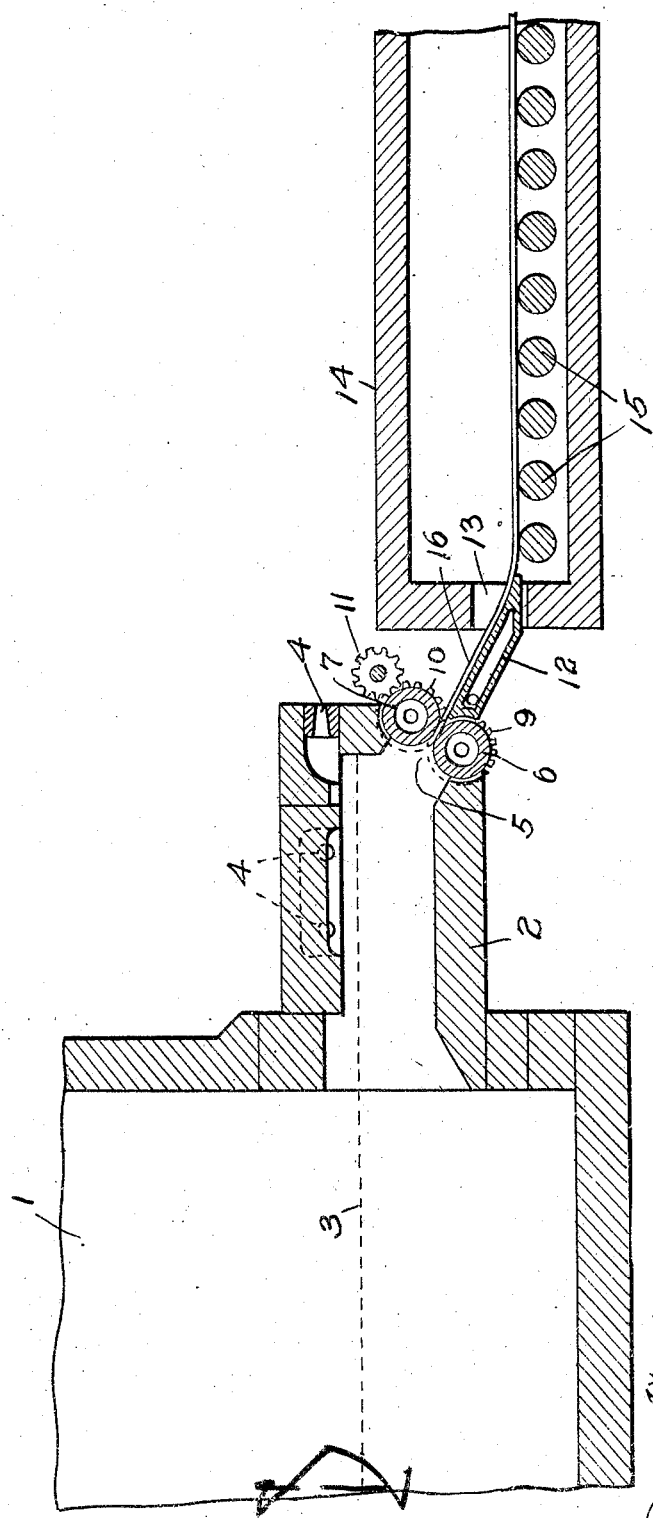
INVENTOR
Frederick Gelstharp
by
James C. Bradley
Atty Patented Nov. 3, 1925.

1,560,080

UNITED STATES PATENT OFFICE.

FREDERICK GELSTHARP, OF TARENTUM, PENNSYLVANIA, ASSIGNOR TO PITTSBURGH PLATE GLASS COMPANY, A CORPORATION OF PENNSYLVANIA.

APPARATUS FOR MAKING SHEET GLASS.

Original application filed August 8, 1923, Serial No. 656,441. Divided and this application filed May 1, 1925. Serial No. 27,172.

*To all whom it may concern:*

Be it known that I, FREDERICK GELSTHARP, a citizen of the United States, and a resident of Tarentum, in the county of Allegheny and State of Pennsylvania, have made a new and useful invention in Improvements in an Apparatus for Making Sheet Glass, of which the following is a specification.

The invention relates to apparatus for forming sheet glass continuously from a tank, the present application constituting a division of my application, Serial No. 656,-441, filed Aug. 8, 1923. The invention has for its objects the provision of an arrangement permitting the formation of a continuous sheet or ribbon having a relatively high temperature at the period of formation. This is a desirable method of procedure, as there is less elongation of any bubbles or seed present in the glass, if such glass, as it passes between the rolls, is relatively hot and fluid, than if the glass is stiffer. This is so, as the rolling operation tends to flatten and elongate the bubbles against their normal tendency to assume a spherical shape, and after the sheet has passed the rolls, this tendency is still exerted and the bubbles or seed resume their original spherical form (either partially or in whole), if the glass is not too stiff to prevent it. The difficulty involved in operating under these conditions is that the sheet will not maintain the shape and cross section to which it is sized by the rolls, if the glass is too soft, and the present invention is designed to overcome this difficulty by the provision of means for chilling the lower surface of the glass and supporting it until the glass has set sufficiently to keep its shape after it passes onto the forwarding rolls in the leer, or leading to it. Such chilling means comprises a hollow metal table, preferably cooled by the circulation of a fluid, such as water, therethrough, and extending from a point between the forming rolls (or closely adjacent thereto) to the forwarding rolls in the leer or leading to such leer. One embodiment of the invention is illustrated in the accompanying drawing wherein:

The figure is a vertical section through the apparatus.

Referring to the drawing, 1 is a melting tank provided with a forehearth or extension 2 with the glass therein lying at the level indicated by the dotted line 3. The forehearth is heated by burners supplying a mixture of gas and air through the passages 4, so that the temperature of the glass in the forehearth may be regulated, if desired. An outlet opening 5 is provided in the side wall of the forehearth, and in this opening is mounted a pair of rolls 6 and 7, which rolls, as indicated, are made hollow with suitable provision for circulating a cooling fluid, such as water, therethrough. These rolls are driven to provide the necessary feed of glass therethrough, which driving of the rolls may be accomplished by the use of the spur gears 9 and 10 secured to the shafts of the rolls 6 and 7, one of the gears being driven by the pinion 11. In advance of the rolls is a supporting table or platen 12, preferably made hollow and cooled by a circulation of water or air therethrough. The end of the table next to the rolls may be tapered, as illustrated to provide a more immediate support for the glass as it emerges from the pass between the rolls than if the table were formed without this taper. The lower end of the table or platen extends into the opening 13 at the inlet end of the leer 14. This leer is shown as provided with a plurality of rolls 15 suitably driven for advancing the sheet of glass therethrough. The showing of the leer is diagrammatic, and it will be understood that any desired form of leer and glass advancing means may be employed, depending upon conditions, although the roll supports as illustrated are believed to constitute the most satisfactory means for accomplishing this function.

The rotation of the rolls serves to withdraw the sheet of glass 16 from the molten bath, and the platen or table 12 supports such sheet until it is received by the rolls 15. The use of the cooled platen or table permits the withdrawal of the glass at a relatively high temperature, as heretofore described, so that the sheet is relatively soft after it emerges from the pass between the rolls and any bubbles or seed which may have been flattened or elongated by the passage of the glass between the rolls have an opportunity to resume their spherical shape before the glass is sufficiently stiffened to prevent this action. The seed or bubbles are much less noticeable in spherical form than when flattened or elongated, so that the product containing the spherical bubbles or seed is regarded as more desirable than that in which the bubbles or seed are so deformed that they are more noticeable. The table 12 promotes the formation of a strong, tough skin upon the lower surface of the sheet, so that it maintains its shape and may be carried over the table without deformation, even though relatively soft and viscous upon its interior. The continuous chilled support thus permits the handling of a sheet which is much softer than would be possible if a non-continuous support or bed, such as that provided by rolls, were used in place of the table, as in such case, the chilling effect upon the sheet would not be as great and it would have a tendency to sag between the rolls. By the time the sheet leaves the table, it has set sufficiently so that little or no deformation occurs during its passage over the rolls 15. If any deformation does occur, it is straightened out as the sheet moves along the rolls and is gradually cooled. The provision of the table 12 with its flat supporting surface thus promotes the formation of a more desirable product, and furthermore, permits the sheet to be formed at a higher rate of speed, thus increasing the production of the apparatus. The use of the table is also particularly desirable in the formation of thick glass, which cools more slowly than thin glass and requires a better support and a greater chilling action upon its lower surface than the thinner glass.

The sheet produced is flat and of uniform thickness having a smooth surface free from corrugations or waves, such as are characteristic of rough plate glass cast in the usual way upon a table and spread thereover by a roll. As a result, the cost of grinding this glass is substantially less than that for grinding glass produced by the old process. Other advantages will be apparent to those skilled in the art.

What I claim is:

1. Means for continuously forming a glass sheet or ribbon from a body of molten glass, comprising a pair of parallel cooled rolls contacting with said molten body, a table with a flat upper surface in advance of the rolls adapted to receive the glass from the rolls, means for cooling the table by a circulating fluid to promote the formation of a supporting skin upon the lower surface of the glass, and transfer means in advance of the table for receiving the glass and carrying it froward.

2. Means for continuously forming a glass sheet or ribbon from a body of molten glass, comprising a pair of parallel cooled rolls contacting with said molten body, a table with a flat upper surface in advance of the rolls, having its end extending into the space between the rolls and adapted to receive the glass from the rolls, means for cooling the table by a circulating fluid to promote the formation of a supporting skin upon the lower surface of the glass, and transfer means in advance of the table for receiving the glass and carrying it forward.

3. Means for continuously forming a glass sheet or ribbon from a body of molten glass, comprising a pair of parallel cooled rolls contacting with said molten body, a table with a flat upper surface in advance of the rolls having its end tapered and extending into the space between the rolls and adapted to receive the glass from the rolls, means for cooling the table by a circulating fluid to promote the formation of a supporting skin upon the lower surface of the glass, and transfer means in advance of the table for receiving the glass and carrying it forward.

4. Means for continuously forming a glass sheet or ribbon from a body of molten glass, comprising a pair of parallel cooled rolls contacting with said molten body, a table with a flat upper surface in advance of the rolls, adapted to receive the glass from the rolls, means for cooling the table by a circulating fluid to promote the formation of a supporting skin upon the surface of the glass, and driven transfer means in advance of the table for receiving the glass and carrying it forward.

5. Means for continuously forming a glass sheet or ribbon from a body of molten glass, comprising a pair of parallel cooled rolls contacting with said molten body, a table with a flat upper surface in advance of the rolls adapted to receive the glass from the rolls, means for cooling the table by a circulating fluid to promote the formation of a supporting skin upon the lower surface of the glass, and a series of driven rollers in advance of the table for receiving the glass and carrying it forward.

In testimony whereof, I have hereunto subscribed my name this 27th day of April, 1925.

FREDERICK GELSTHARP.